United States Patent
Baughman et al.

(10) Patent No.: US 11,942,070 B2
(45) Date of Patent: Mar. 26, 2024

(54) VOICE CLONING TRANSFER FOR SPEECH SYNTHESIS

(71) Applicant: INTERNATIONAL BUSINESS MACHINES CORPORATION, Armonk, NY (US)

(72) Inventors: Aaron K. Baughman, Cary, NC (US); Gray Franklin Cannon, Atlanta, GA (US); Sara Perelman, New York, NY (US); Gary William Reiss, Buford, GA (US); Corey B. Shelton, Marietta, GA (US)

(73) Assignee: International Business Machines Corporation, Armonk, NY (US)

( * ) Notice: Subject to any disclaimer, the term of this patent is extended or adjusted under 35 U.S.C. 154(b) by 200 days.

(21) Appl. No.: 17/248,556

(22) Filed: Jan. 29, 2021

(65) Prior Publication Data
US 2022/0246130 A1 Aug. 4, 2022

(51) Int. Cl.
*G10L 13/02* (2013.01)
*G06N 3/08* (2023.01)
(Continued)

(52) U.S. Cl.
CPC ............ *G10L 13/02* (2013.01); *G06N 3/08* (2013.01); *G10L 15/18* (2013.01); *G10L 25/30* (2013.01); *G10L 25/51* (2013.01)

(58) Field of Classification Search
CPC ......... G10L 13/02; G10L 15/18; G10L 25/30; G10L 25/51; G06N 3/08
See application file for complete search history.

(56) References Cited

U.S. PATENT DOCUMENTS 10,388,272 B1 * 8/2019 Thomson ................ G10L 15/26
2017/0076715 A1 3/2017 Ohtani et al.
(Continued)

OTHER PUBLICATIONS

Blaauw, et al., "Data Efficient Voice Cloning for Neural Singing Synthesis," ICASSP 2019—2019 IEEE International Conference on Acoustics, Speech and Signal Processing (ICASSP), May 12-17, 2019 [accessed on Jan. 12, 2021], pp. 6840-6844, IEEE, Brighton, UK, UK, DOI: 10.1109/ICASSP.2019.8682656, Retrieved from the Internet: <URL: https://ieeexplore.ieee.org/document/8682656>.
(Continued)

*Primary Examiner* — Richemond Dorvil
*Assistant Examiner* — Ethan Daniel Kim
(74) *Attorney, Agent, or Firm* — Elliot J. Shine

(57) ABSTRACT

A method, computer system, and a computer program product for speech synthesis is provided. The present invention may include generating one or more final voiceprints. The present invention may include generating one or more voice clones based on the one or more final voiceprints. The present invention may include classifying the one or more voice clones into a grouping using a language model, wherein the language model is trained using manually classified uncloned voice samples. The present invention may include identifying a cluster within the grouping, wherein the cluster is identified by determining a difference between corresponding vectors of the one or more voice clones below a similarity threshold. The present invention may include generating a new archetypal voice by blending the one or more voice clones of the cluster where the difference between the corresponding vectors is below the similarity threshold.

20 Claims, 5 Drawing Sheets

(51) Int. Cl.
  *G10L 15/18* (2013.01)
  *G10L 25/30* (2013.01)
  *G10L 25/51* (2013.01)

(56) References Cited

U.S. PATENT DOCUMENTS

| | | | |
|---|---|---|---|
| 2018/0268806 | A1 | 9/2018 | Chun et al. |
| 2019/0221225 | A1* | 7/2019 | Bricklin ............... G10L 21/003 |
| 2019/0251952 | A1 | 8/2019 | Arik et al. |
| 2020/0169591 | A1* | 5/2020 | Ingel ....................... H04L 29/06 |
| 2020/0243094 | A1* | 7/2020 | Thomson ............... G10L 15/32 |
| 2020/0311572 | A1 | 10/2020 | Baker |
| 2021/0224319 | A1* | 7/2021 | Ingel ....................... G06F 16/683 |

OTHER PUBLICATIONS

Changjiang's Blog, "How to compute Equal Error Rate (EER) on ROC curve," GitHub.io, Sep. 24, 2016 [accessed on Jan. 12, 2021], 2 pages, Retrieved from the Internet: <URL: https://yangcha.github.io/EER-ROC/>.

Chittaragi, et al., "Automatic dialect identification system for Kannada language using single and ensemble SVM algorithms," Language Resources and Evaluation 54, Nov. 21, 2019, pp. 553-585, vol. 54, Springer Nature B. V., DOI: https://doi.org/10.1007/s10579-019-09481-5; Retrieved from the Internet: <URL: https://link.springer.com/article/10.1007%2Fs10579-019-09481-5>.

Jia, et al., "Transfer Learning from Speaker Verification to Multispeaker Text-To-Speech Synthesis," 32nd Conference on Neural Information Processing Systems, 2018, 15 pages, Cornell University, arXiv:1806.04558, Retrieved from the Internet: <URL: https://arxiv.org/abs/1806.04558>.

Lee, et al., "Accelerating search-based program synthesis using learned probabilistic models," PLDI 2018: Proceedings of the 39th ACM SIGPLAN Conference on Programming Language Design and Implementation, Jun. 18-22, 2018 [accessed on Jan. 12, 2021], pp. 436-449, ACM, New York, NY, Retrieved from the Internet: <URL: https://dl.acm.org/doi/abs/10.1145/3192366.3192410>.

Malik, "Securing Voice-Driven Interfaces Against Fake (Cloned) Audio Attacks," 2019 IEEE Conference on Multimedia Information Processing and Retrieval (MIPR), Mar. 28-30, 2019 [accessed on Jan. 12, 2021], pp. 512-517, IEEE, San Jose, CA, USA, DOI: 10.1109/MIPR.2019.00104, Retrieved from the Internet: <URL: https://ieeexplore.ieee.org/document/8695320>.

Mell, et al., "The NIST Definition of Cloud Computing", National Institute of Standards and Technology, Special Publication 800-145, Sep. 2011, 7 pages.

Minematsu, "Individual-based accent clustering of World Englishes using the Speech Accent Archive," The Journal of the Acoustical Society of America, Abstract Nov. 18, 2016 [accessed on Jan. 12, 2021], p. 3284, vol. 140, Issue 4, https://doi.org/10.1121/1.4970437, Retrieved from the Internet: <URL: https://asa.scitation.org/doi/10.1121/1.4970437>.

Morishima, "Face and gesture capturing and cloning for life-like agent," RO-MAN 2004. 13th IEEE International Workshop on Robot and Human Interactive Communication (IEEE Catalog No. 04TH8759), Sep. 20-22, 2004 [accessed on Jan. 12, 2021], pp. 171-176, IEEE, Kurashiki, Okayama, JP, DOI: 10.1109/ROMAN.2004.1374750, Retrieved from the Internet: <URL: https://ieeexplore.ieee.org/document/1374750>.

ReadSpeaker, "Custom Branded Voices," ReadSpeaker Datasheet [online], [accessed on Jan. 12, 2021], 10 pages, Retrieved from the Internet: <URL: https://www.readspeaker.com/branded-custom-voice/>.

Sinha, et al., "Empirical analysis of linguistic and paralinguistic information for automatic dialect classification," The Artificial Intelligence Review, Jul. 28, 2017, pp. 647-672, vol. 51, Springer Science+Business Media B.V., DOI: https://doi.org/10.1007/s10462-017-9573-3, Retrieved from the Internet: < URL: https://link.springer.com/article/10.1007%2Fs10462-017-9573-3>.

Wang, et al., "Comic-guided speech synthesis," ACM Transactions on Graphics, Nov. 2019 [accessed on Jan. 12, 2021], 14 Pages, vol. 38, No. 6, Article 187, Retrieved from the Internet: <URL: https://dl.acm.org/doi/abs/10.1145/3355089.3356487>.

Zhang, et al., "Sequence-to-Sequence Acoustic Modeling for Voice Conversion," IEEE/ACM Transactions on Audio, Speech and Language Processing, Mar. 2019 [accessed on Jan. 12, 2021], pp. 631-644, vol. 27, No. 3, Retrieved from the Internet: <URL: https://dl.acm.org/doi/abs/10.1109/TASLP.2019.2892235>.

\* cited by examiner

# VOICE CLONING TRANSFER FOR SPEECH SYNTHESIS

BACKGROUND

The present invention relates generally to the field of computing, and more particularly to text-to-speech technology.

Speech synthesis may be the artificial production of human speech. A computer system used for this purpose may be referred to as a speech computer or speech synthesizer and may be implemented in software or hardware products. A text-to-speech (TTS) system may convert normal language text into speech. Devices such as, but not limited to, smart speakers and smart headphones, may utilize TTS in order to provide confirmations to users' questions and confirmations to following their commands. In the enterprise world, call centers may utilize TTS to enable quicker service on routine issues and allow human agents to focus on complex scenarios. Modern TTS voices may exhibit significant variation across many characteristics. The most impactful may be the voice's accent.

Accents may be used to connect with groups who share geography or culture. Further, accents may be used to evoke feelings about a product, service, or company.

SUMMARY

Embodiments of the present invention disclose a method, computer system, and a computer program product for speech synthesis. The present invention may include generating one or more final voiceprints. The present invention may include generating one or more voice clones based on the one or more final voiceprints. The present invention may include classifying the one or more voice clones into a grouping using a language model. The present invention may include identifying a cluster within the grouping. The present invention may include generating a new archetypal voice by blending the one or more voice clones of the cluster.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
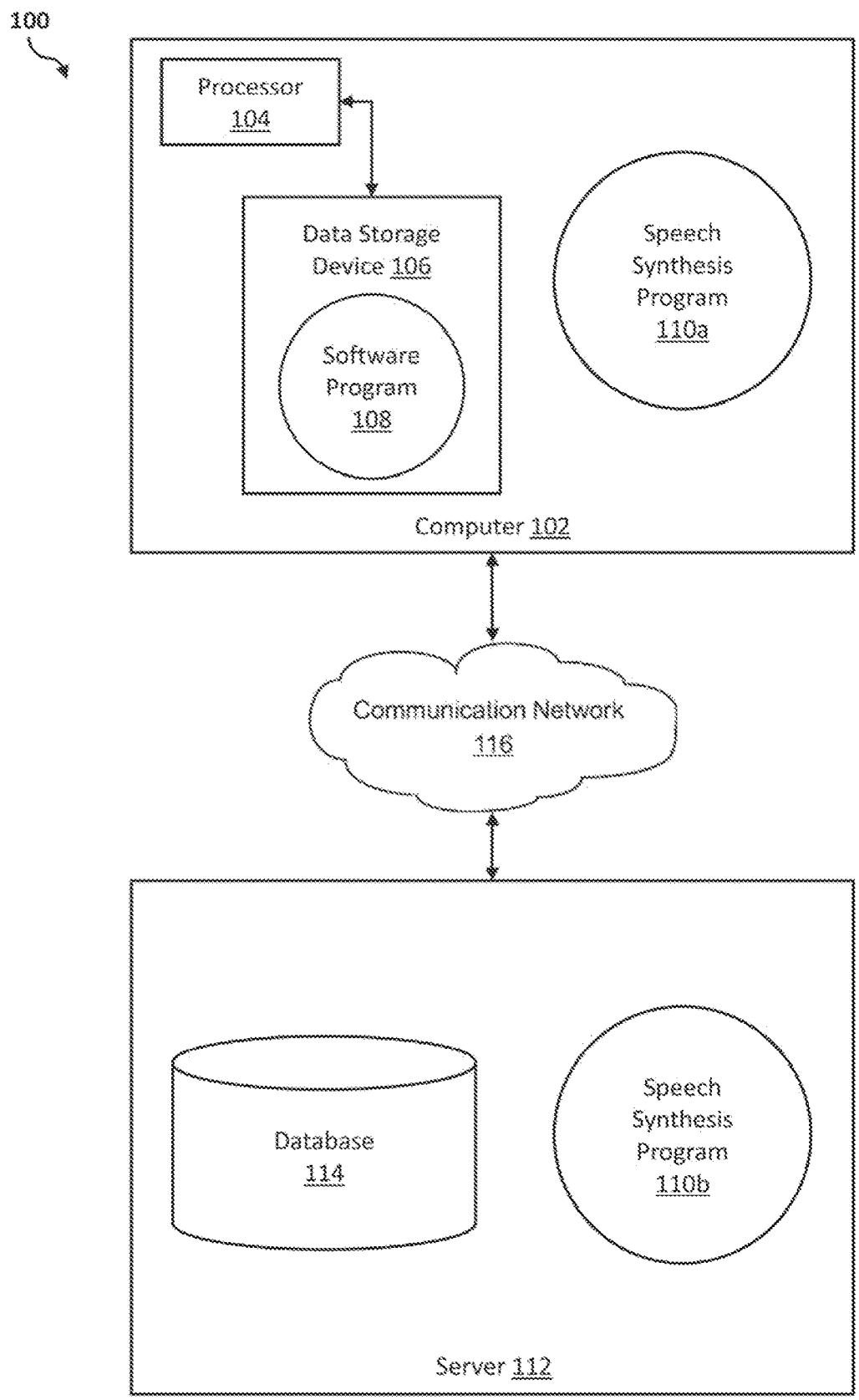
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for speech synthesis. As such, the present embodiment has the capacity to improve the technical field of text-to-speech technology by synthesizing new text-to-speech voices from voice clones. More specifically, the present invention may include generating one or more final voiceprints by adjusting one or more initial voiceprints using a generative adversarial network. The present invention may include generating one or more voice clones based on the one or more final voiceprints. The present invention may include classifying the one or more voice clones into a grouping using a language model, wherein the language model is trained using manually classified uncloned voice samples. The present invention may include identifying a cluster within the grouping, wherein the cluster is identified by determining a difference between corresponding vectors of the one or more voice clones below a similarity threshold. The present invention may include generating a new archetypal voice by blending the one or more voice clones of the cluster where the difference between the corresponding vectors is below the similarity threshold.

As described previously, speech synthesis may be the artificial production of human speech. A computer system used for this purpose may be referred to as a speech computer or speech synthesizer and may be implemented in software or hardware products. A text-to-speech (TTS) system may convert normal language text into speech. Devices such as, but not limited to, smart speakers and smart headphones, may utilize TTS in order to provide confirmations to users' questions and confirmations to following their commands. In the enterprise world, call centers may utilize TTS to enable quicker service on routine issues and allow human agents to focus on complex scenarios. Modern TTS voices may exhibit significant variation across many characteristics. The most impactful may be the voice's accent.

Accents may used to connect with groups who share geography or culture. Further, accents may be used to evoke feelings about a product, service, or company.

Therefore, it may be advantageous to, among other things, generate one or more final voiceprints, generate one or more voice clones, classify the one or more voice clones into a grouping using a language model, identify a cluster within the grouping, and generate a new archetypal voice by blending the one or more voice clones of the cluster.

According to at least one embodiment, the present invention may improve the range of voiceprints by using external stimuli to evoke a greater range from a speaker.

According to at least one embodiment, the present invention may improve the effectiveness in generating specific accents by identifying a cluster within a grouping and generating a new archetypal voice by blending the one or more voice clones of the cluster where the difference between the corresponding vectors is below the similarity threshold.

According to at least one embodiment, the present invention may improve specific accents by allowing a user to blend two or more archetypal voices and generate a voice clone based on a blend of the two or more archetypal voices.

According to at least one embodiment, the present invention may improve the effectiveness in which subgroupings within accent classifications are identified.

According to at least one embodiment, the present invention may allow for the generating of archetypal voices with relatively small amounts of sample speech.

According to at least one embodiment, the present invention may allow for the generating of archetypal voices from both a live speaker and an offline speaker.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a speech synthesis program 110a. The networked computer environment 100 may also include a server 112 that is enabled to run a speech synthesis program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 3, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the speech synthesis program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the speech synthesis program 110a, 110b (respectively) to generate a new archetypal voice by blending one or more voice clones of an identified cluster within a grouping. The speech synthesis method is explained in more detail below with respect to FIG. 2.

Figure 2:
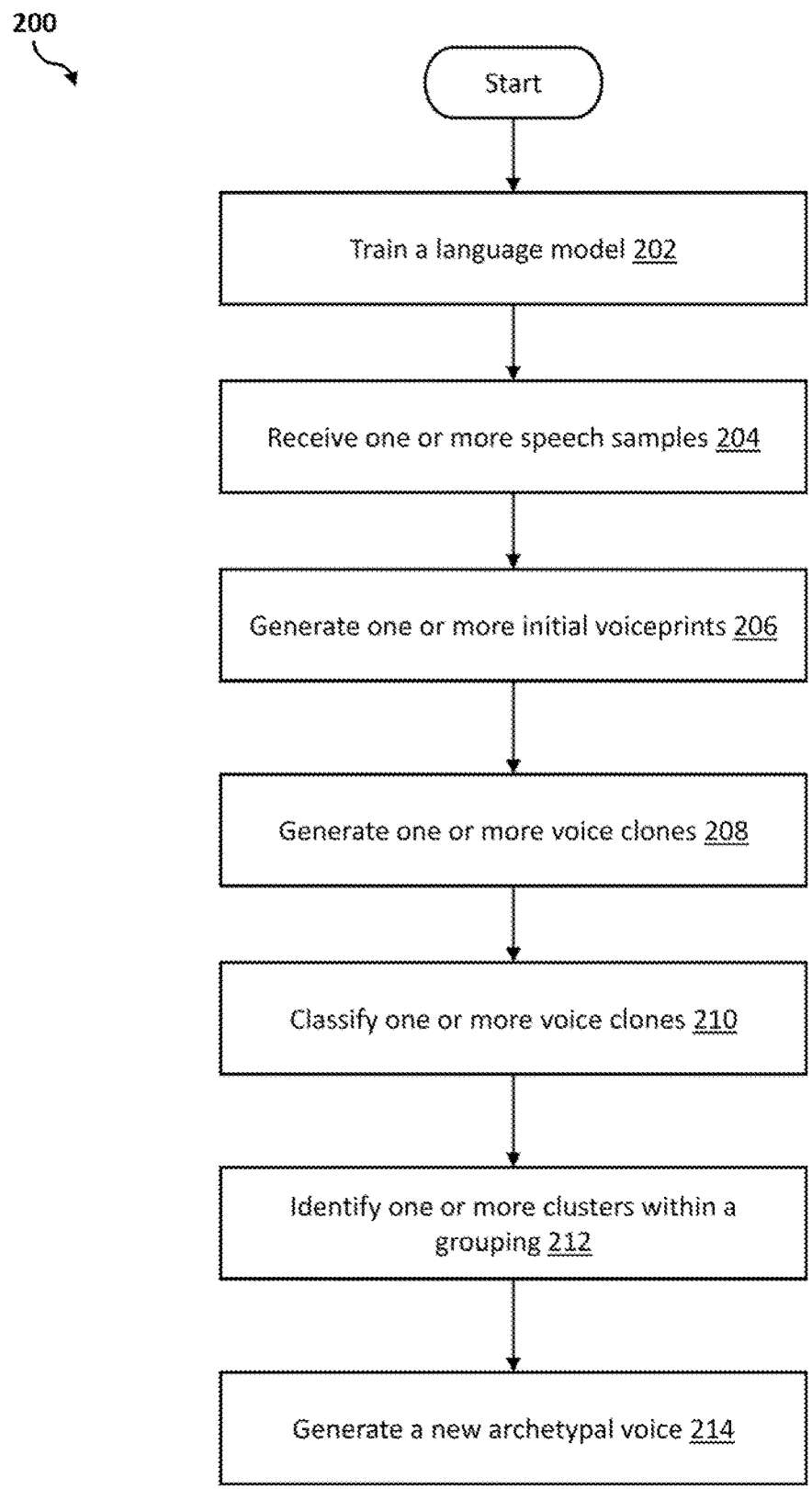
FIG. 2 is an operational flowchart illustrating a process for speech synthesis according to at least one embodiment.

Referring now to FIG. 2, an operational flowchart illustrating the exemplary speech synthesis process 200 used by the speech synthesis program 110a and 110b (hereinafter speech synthesis program 110) according to at least one embodiment is depicted.

At 202, the speech synthesis program trains a language model. The speech synthesis program 110 may train the language model using transfer learning. Transfer learning may be a technique in which a pre-trained model is used but is fine-tuned for a related task. The speech synthesis program 110 may train the language model, by way of transfer learning, such as, but not limited to Bidirectional Encoder Representations from transformers (BERT). The speech synthesis program 110 may utilize a connected speech corpus 114 (e.g., database 114, speech corpus 114) in training the language model.

The connected speech corpus 114 (e.g., database 114, speech corpus 114) may be originally comprised of uncloned voice samples. An uncloned voice sample may be an original (e.g., unedited) speech sample from a speaker. The speech corpus 114 may store the uncloned voice samples as well as identifying information. Identifying information may include information about the speaker, such as, but not limited to, age, country of origin, locations the speaker has resided and for how long, gender, amongst other identifying information. The uncloned voice samples may be classified into two or more groupings (e.g., accents). The uncloned voice samples may be manually classified into the two or more groupings (e.g., accents). For example, the uncloned voice samples may be manually classified into American-English and British-English. The speech corpus may also store one or more new archetypal voices, as will be described in more detail below with respect to step 210.

The speech synthesis program 110 may utilize the uncloned voice samples as input for the language model. The language model may generate a vector representation for each word of the uncloned voice sample. The output of the language model may be a stack of encoders and decoders, as will be described in more detail below with respect to step 206.

The speech synthesis program 110 may also utilize the language model to generate an independent set of attention masks with encoders. An attention mask may be a vector that weights a word differently. The speech synthesis program 110 may place a greater weight on words of the uncloned voice samples determined by the language model to be of greater importance in understanding a sentence and/or speech.

At 204, the speech synthesis program 110 receives one or more speech samples. Each of the one or more speech samples may originate from a speaker. The speech synthesis program 110 may receive the one or more speech samples (e.g., excerpts) from more than one speaker and/or more than one speech sample (e.g., excerpts) from the same speaker.

The speech synthesis program 110 may receive speech samples from both a live speaker and/or an offline speaker. A live speaker may be a speaker capable of reacting to an external stimulus in real time, as will be described in more detail below with respect to Step 206 below. The speech synthesis program 110 may receive identifying information with respect to the live speaker. The live speaker may provide the identifying information.

An offline speaker may be pre-recorded, and accordingly, the offline speaker may be incapable of reacting to an external stimulus, as will be described in more detail below with respect to Step 206 below. The speech synthesis program 110 may receive identifying information with respect to the offline speaker. The identifying information for the offline speaker may have to be manually input.

At 206, the speech synthesis program 110 generates one or more initial voiceprints. The speech synthesis program 110 may generate the one or more initial voiceprints for each of the one or more speech samples. The voiceprint may be an individually distinctive pattern of characteristics that may be spectrographically produced. The voiceprint may be comprised of a matrix of values utilizing multidimensional vectors.

The speech synthesis program 110 may generate the one or more initial voiceprints by applying the stack of encoders and decoders generated as output in Step 202. The learned weights of the stacked encoders and decoders are applied to the one or more speech samples to generate the one or more initial voiceprints. The speech synthesis program 110 may apply the independent set of attention masks with encoders to the one or more speech samples received from a live speaker in order to weight speech resulting from an external stimulus differently. The external stimulus may be utilized for a live speaker in order to generate an initial voiceprint with a greater range in vector values. The external stimulus may be encoded into the vectors with information such as, but not limited to, the objective of the external stimulus, the stimulus applied, intensity of stimulus applied, amongst other information.

The speech synthesis program 110 may derive a final voiceprint for each of the one or more initial voiceprints by adjusting (e.g., fine tuning) each of the one or more initial voiceprints. The speech synthesis program 110 may fine tune each of the or more initial voiceprints utilizing a machine learning framework, such as, but not limited to, a generative adversarial network (GAN). GAN may be a machine learning framework in which two neural networks contest one another, GAN may be used to distinguish real data from data created by a generator. One neural network may be a generator and one neural network may be a discriminator. The speech synthesis program 110 may utilize the one or more initial voiceprints as input and the generator neural network may propose each of the initial voiceprints to the discriminator neural network. The discriminator neural network may attempt to determine if the voiceprint is a voiceprint or uncloned voice sample. If the discriminator gets the answer wrong, the initial voiceprint may be fine tuned by adjusting the attention masks and incrementally feeding back error. The speech synthesis program 110 may utilize this feedback mechanism to adapt the transfer learning model within an active learning paradigm. The speech synthesis program 110 may continue to fine tune a voiceprint until specified halting criteria is reached. The speech synthesis program 110 may derive the final voiceprint for each of the one or more initial voiceprints upon reaching the specified halting criteria.

At 208, the speech synthesis program generates one or more voice clones. The speech synthesis program 110 may generate the one or more voice clones based on the one or more final voiceprints. Each of the one or more voice clones may have a corresponding final voiceprint. The speech synthesis program 110 may utilize the one or more final voiceprints as input for a deep feed forward neural network. A feedforward neural network may be an artificial neural network where the connections between units do not form a cycle. In a feedforward neural network the information may only travel forward in the network, first through the input nodes, then the hidden nodes (if present), and finally through the output node layers.

The deep feed forward neural network may receive as input the one or more final voiceprints and generate as output one or more voice clones. A voice clone may be the decoded version of a voiceprint. While a voiceprint is may be comprised of one or more multidimensional vectors, the voice clone may be the corresponding audio version of the voiceprint. As will be described in more detail below with respect to step 214, the corresponding final voiceprints of the one or more voice clones may be blended based on a subgrouping (e.g., cluster) or across multiple subgroupings (e.g., clusters). Generating a new archetypal voice by blending multiple subgroupings (e.g., clusters) may be determined based on the subgroupings selected by a user.

At 210, the speech synthesis program 110 classifies the one or more voice clones. The speech synthesis program 110 may utilize the trained language model, described in Step 202 above, in classifying the one or more voice clones. The voice clones may be classified into one of the two or more groupings (e.g., accents) of the speech corpus 114 (e.g., connected speech corpus 114, database 114). The one or more voice clones may be classified into one of the two or more groupings (e.g., accents) by the trained language model if the voice clone equals or exceeds a confidence level. The one or more voice clones may be classified into an unknown grouping by the trained language model if the voice clone is below a confidence level.

The trained language model may utilize binary classification in classifying the one or more voice clones. Binary classification may refer to those classification tasks that have two groupings. The trained language model may utilize one or more algorithms in performing a binary classification of the one or more voice clones, such as, but not limited to, k-nearest neighbor, logistic regression, decision trees, support vector machines, amongst others. The trained language model may be trained using the uncloned voice samples, wherein the uncloned voice samples may be classified into two groupings (e.g., accents) based on identifying information encoded in the uncloned voice samples, detailed in step 202 above.

For example, the uncloned voice samples of the connected speech corpus 114 (e.g., speech corpus 114, database 114) may be manually classified into the groupings (e.g., accents) American-English or British-English based on identifying information encoded in the uncloned voice samples. The trained language model may classify the one or more voice clones as either American-English, British-English, or unknown. The trained language model may classify a voice clone as American-English or British-English if the voice clone equals or exceeds a confidence level. The trained language model may classify a voice clone as unknown if the voice clone is below a confidence level. As the trained language model classifies more voice clones the trained language model may reclassify unknown voice clones into groupings.

The trained language model may utilize multi-class classification in classifying the one or more voice clones. Multi-class classification may refer to those classification tasks that have more than two groupings. The trained language model may utilize one or more algorithms in performing a multi-class classification of the one or more voice clones, such as, but not limited to, k-nearest neighbors, decision trees, naïve bayes, random forest, gradient boosting, amongst others. The trained language model may be trained using the uncloned voice samples, wherein the uncloned voice samples may be classified into two groupings (e.g., accents) based on identifying information encoded in the uncloned voice samples as detailed in Step 202 as well as additional groupings determined by the speech synthesis program 110 based on clustering, as will be described in more detail in Step 212 below. Additional groupings (e.g., accents) determined by the speech synthesis program 110 may be manually classified or automatically classified using identifying information by the speech synthesis program 110.

For example, the uncloned voice samples of the connected speech corpus 114 (e.g., speech corpus 114, database 114) may be manually classified into American-English or British-English. The trained language model may classify the one or more voice clones into American-English, British-English, or unknown. The trained language model may classify the one or more voice clones into American-English or British-English if the voice clone equals or exceeds a confidence level. The speech synthesis program 110 may receive for example, 100 speech samples, and accordingly generate 100 voice clones through the steps outlined above. Out of the 100 voice clones, 50 may be classified into the grouping (e.g., accent) American-English and 50 may be classified into the grouping (e.g., accent) British-English. Within each grouping distinct clusters (e.g., subgroupings) may for. Within American-English two clusters of 20 voice prints may form. As will be explained in more detail below in step 212, the speech synthesis program 110 may classify the subgroupings within American-English. Such as, American-English-Northern and American-English-Southern, these subgroupings may be added as classifications to the speech corpus (e.g., connected speech corpus 114, database 114). The trained language model may utilize multi-class classification to classify one or more received voice clones into the groupings and subgroupings (e.g., clusters).

At 212, the speech synthesis program identifies one or more clusters within a grouping. The speech synthesis program 110 may identify one or more clusters (e.g., subgroupings) within a grouping by mapping the one or more voice clones within a grouping. The speech synthesis program 110 may map the one or more voice clones within a grouping using the corresponding final voiceprint. Each of the one or more voice clones may have a corresponding final voiceprint as described in step 208. The speech synthesis program 110 may map the one or more final voiceprints for the corresponding voice clone using the multi-dimensional vector describing the voice clone.

The speech synthesis program 110 may utilize a sound processing technique, such as, but not limited to, mel-frequency cepstrum (MFC). The speech synthesis program 110 may generate the mel-frequency for each of the voice clones of a grouping using the corresponding final voiceprint. The speech synthesis program 110 may identify the one or more clusters (e.g., subgroupings) by determining a numerical difference between corresponding vectors generated by mel-frequency. A subgrouping (e.g., cluster) may be two or more voice clones within a grouping with a vector difference below a similarity threshold.

The speech synthesis program 110 may utilize one or more clustering algorithms in determining the numerical difference between the vectors generated by mel-frequency, such as, but not limited to, k means clustering, cosine similarity, Euclidean distance, score vector machines, amongst others.

For example, within the American-English grouping two clusters (e.g., subgroupings) may form. The speech synthesis may generate the mel-frequency for each of the voice clones of a each of the two clusters (e.g., subgroupings) using the corresponding final voiceprint. The speech synthesis program 110 may determine based on the numerical difference between the vectors in Cluster 1 that the vector difference is 0.1 and the similarity threshold is 0.3, accordingly the speech synthesis program 110 may determine that Cluster 1 (e.g., subgrouping) may be a subgrouping. The subgrouping may be classified as a new accent manually or automatically by the speech synthesis program 110. The speech synthesis program 110 may automatically label the subgrouping (e.g., cluster) as an accent using the identifying information if the voice clone is from a live speaker. Such as, American-English-Southern if the identifying information for the subgrouping (e.g., cluster) indicates Southern-American speakers.

At 214, the speech synthesis program generates a new archetypal voice. The speech synthesis program 110 may generate the new archetypal voice by blending one or more voice clones. The speech synthesis program 110 may blend the one or more voice clones of an identified subgrouping wherein the one or more voice clones of the subgrouping have a vector difference below the similarity threshold. The speech synthesis program 110 may label the new archetypal voice as an accent using the identifying information of the live speaker.

The speech synthesis program 110 may blend the one or more voice clones by mathematical operation to generate the new archetypal voice. The archetypal voice being a single voiceprint representative of the subgroup (e.g., cluster) identified. The speech synthesis program 110 may average the corresponding vectors of the one or more voice clones of the identified subgrouping.

The speech synthesis program 110 may generate a new archetypal voice by blending multiple subgroupings (e.g., clusters) based on the subgroupings (e.g., clusters) selected by a user. The speech synthesis program 110 may blend one or more voice clones within a subgroup (e.g., cluster) or across multiple subgroups (e.g., clusters) based on the multidimensional vectors of the corresponding final voiceprint. The user of the speech synthesis program 110 may manually select the one or more final voiceprints of which the vectors are to be blended. The user may select two or more subgroups (e.g., clusters) in which the one or more final voiceprint vectors are to be blended. The user may select the two or more subgroups (e.g., clusters) to be blended from a display. The display may utilize the label of the archetypal voice to present the blending options to the user. The label may be an accent. The accent may be determined based on the identifying information encoded (e.g., embedded) in one or more speech samples received, as detailed above in step 204.

The accent may be determined based on the identifying information of the live speaker of the corresponding one or more voice samples. The accent may be determined based on the identifying information of the offline speaker of the corresponding one or more voice samples. The identifying information of the offline speaker may be manually input into the speech synthesis program 110.

The speech synthesis program 110 may store the new archetypal voice in the speech corpus 114 (e.g., connected speech corpus 114, database 114). The speech synthesis program 110 may utilize the new archetypal voice to retrain the language model.

The speech synthesis program 110 may be able to receive text from a user and generate audio based on the new archetypal voice, the archetypal voice exhibiting the characteristics of the subgrouping (e.g., cluster). The speech synthesis program 110 may allow a user to generate a personalized archetypal voice, the personalized archetypal voice may blend one or more archetypal voices selected by the user.

It may be appreciated that FIG. 2 provides only an illustration of one embodiment and do not imply any limitations with regard to how different embodiments may be implemented. Many modifications to the depicted embodiment(s) may be made based on design and implementation requirements.

Figure 3:
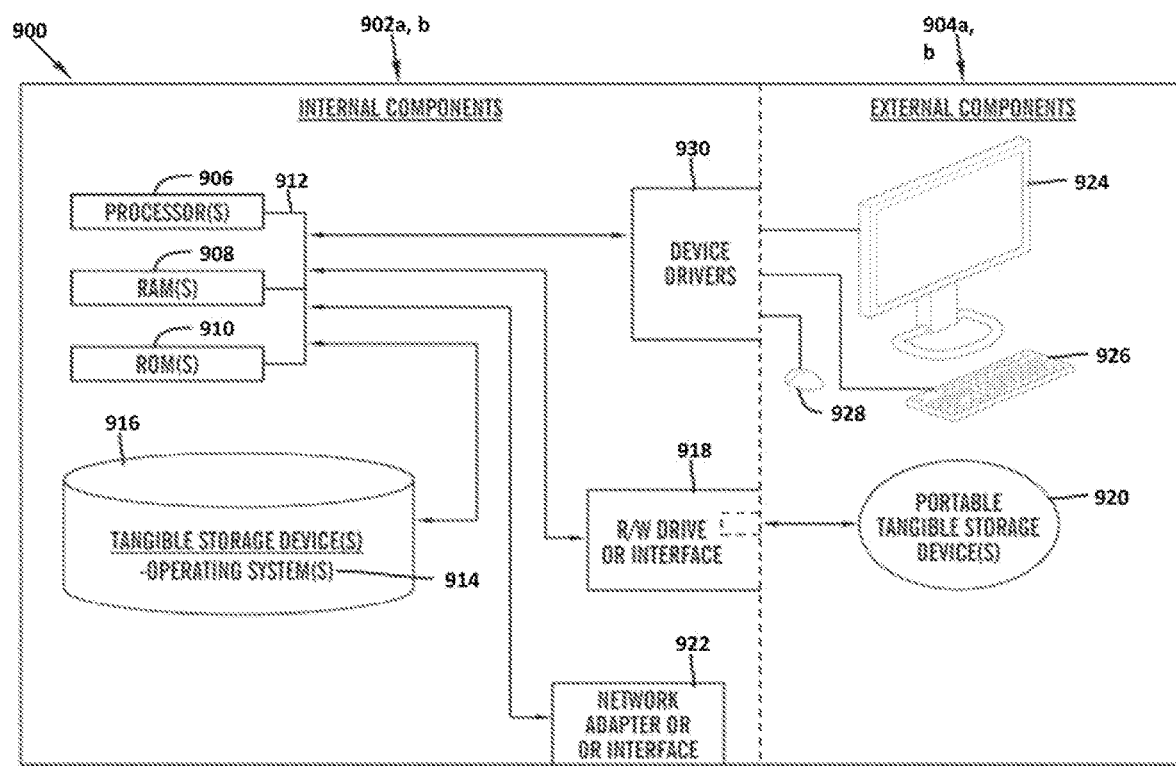
FIG. 3 is a block diagram of internal and external components of computers and servers depicted in FIG. 1 according to at least one embodiment.

FIG. 3 is a block diagram 900 of internal and external components of computers depicted in FIG. 1 in accordance with an illustrative embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may be represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902a, b and external components 904a, b illustrated in FIG. 3. Each of the sets of internal components 902a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108, and the speech synthesis program 110a in client computer 102, and the speech synthesis program 110b in network server 112, may be stored on one or more computer-readable tangible storage devices 916 for execution by one or more processors 906 via one or more RAMs 908 (which typically include cache memory). In the embodiment illustrated in FIG. 3, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the speech synthesis program 110a and 110b can be stored on one or more of the respective portable computer-readable tangible storage devices 920, read via the respective R/W drive or interface 918 and loaded into the respective hard drive 916.

Each set of internal components 902a, b may also include network adapters (or switch port cards) or interfaces 922 such as a TCP/IP adapter cards, wireless wi-fi interface cards, or 3G or 4G wireless interface cards or other wired or wireless communication links. The software program 108 and the speech synthesis program 110a in client computer 102 and the speech synthesis program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the speech synthesis program 110a in client computer 102 and the speech synthesis program 110b in network server computer 112 are loaded into the respective hard drive 916. The network may comprise copper wires, optical fibers, wireless transmission, routers, firewalls, switches, gateway computers and/or edge servers.

Each of the sets of external components 904a, b can include a computer display monitor 924, a keyboard 926, and a computer mouse 928. External components 904a, b can also include touch screens, virtual keyboards, touch pads, pointing devices, and other human interface devices. Each of the sets of internal components 902a, b also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
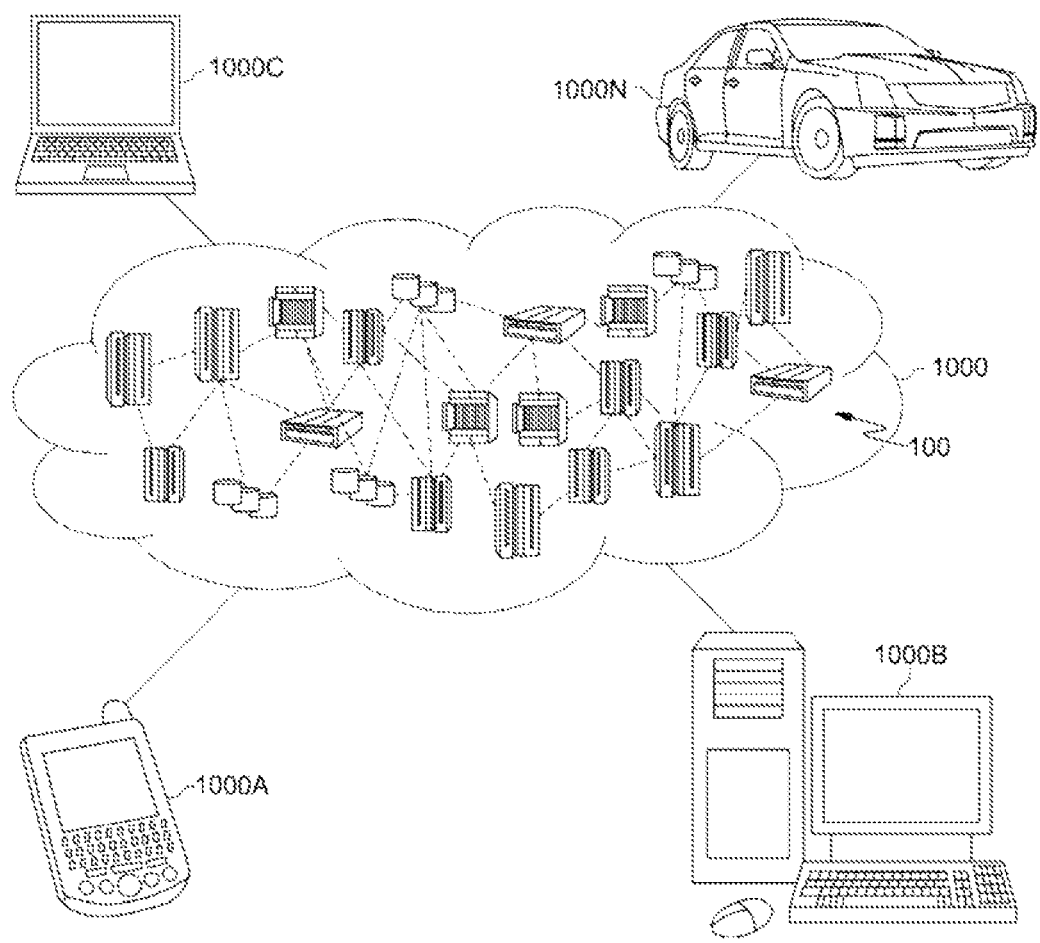
FIG. 4 is a block diagram of an illustrative cloud computing environment including the computer system depicted in FIG. 1, in accordance with an embodiment of the present disclosure.

Referring now to FIG. 4, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 4 are intended to be illustrative only and that computing nodes 100 and cloud computing environment 1000 can communicate with any type of computerized device over any type of network and/or network addressable connection (e.g., using a web browser).

Figure 5:
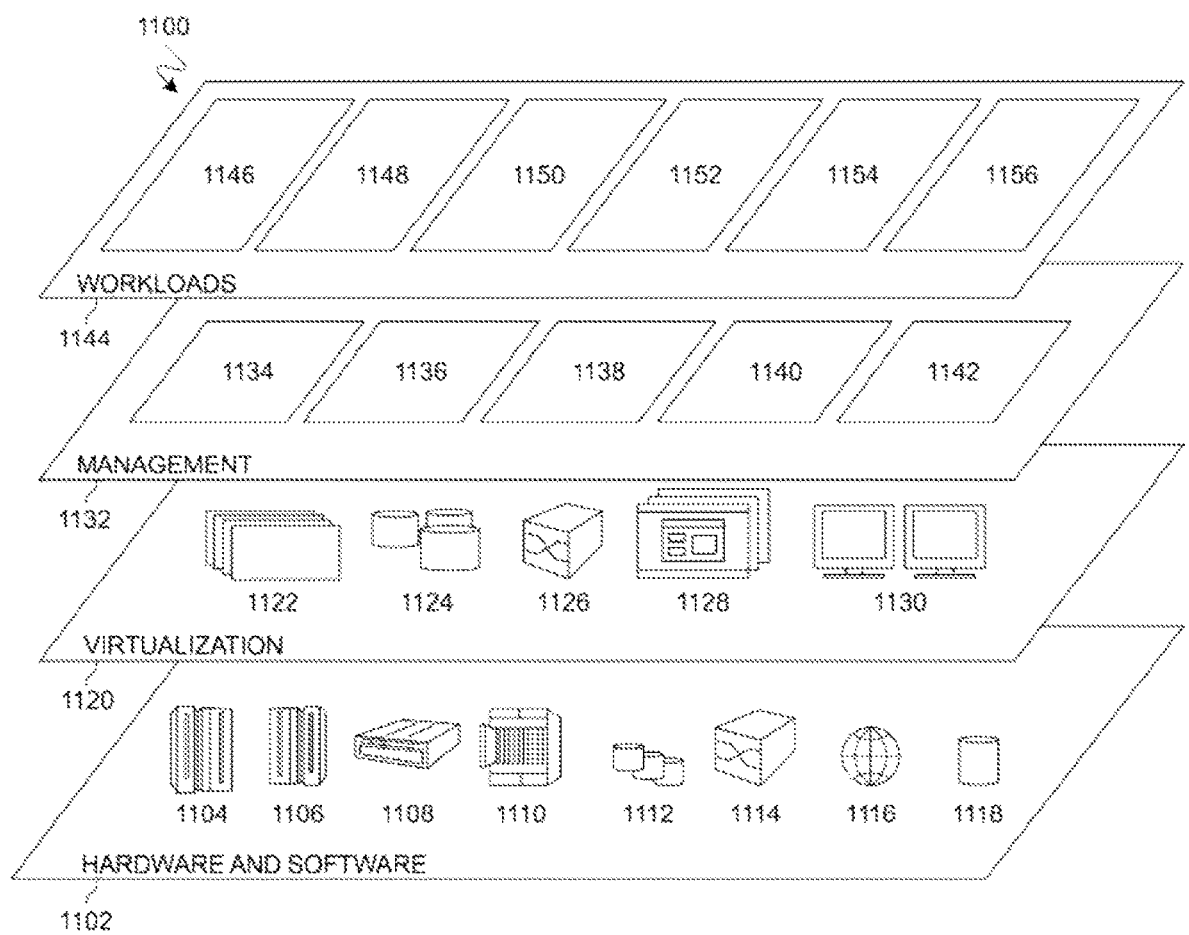
FIG. 5 is a block diagram of functional layers of the illustrative cloud computing environment of FIG. 4, in accordance with an embodiment of the present disclosure.

Referring now to FIG. 5, a set of functional abstraction layers 1100 provided by cloud computing environment 1000 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include mapping and navigation 1146; software development and lifecycle management 1148; virtual classroom education delivery 1150; data analytics processing 1152; transaction processing 1154; and speech synthesis 1156. A speech synthesis program 110a, 110b provides a way to generate a new archetypal voice by blending one or more voice clones of a cluster.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for speech synthesis, the method comprising:
generating one or more final voiceprints by adjusting one or more initial voiceprints using a generative adversarial network;
generating one or more voice clones based on the one or more final voiceprints;
classifying the one or more voice clones into a grouping using a language model, wherein the grouping is comprised of at least two or more subgroupings based on a multi-class classification performed by the language model using corresponding vectors, and wherein the two or more subgroupings are added as classifications to a speech corpus;
identifying a cluster within the grouping, wherein the cluster is identified by determining a difference between corresponding vectors of the one or more voice clones below a similarity threshold;
generating a new archetypal voice by blending the one or more voice clones of the cluster where the difference between the corresponding vectors is below the similarity threshold, wherein the new archetypal voice is labeled utilizing identifying information embedded in the one or more final voiceprints corresponding to the one or more voice clones below the similarity threshold; and
generating a personalized archetypal voice by blending the new archetypal voice and at least one other archetypal voice selected by a user from the speech corpus using a display, wherein the display includes a plurality of labeled archetypal voices available to the user for blending.

2. The method of claim 1, wherein the one or more initial voiceprints are generated from one or more speech samples using a learned weight of a stack of encoders and a stack of decoders generated by the language model, the language model being trained by way of transfer learning.

3. The method of claim 2, wherein at least a portion of the one or more speech samples used in generating the one or more initial voiceprints are received from a live speaker, wherein an external stimulus is used for the live speaker to increase a range of vector values.

4. The method of claim 3, wherein the external stimulus is encoded into one or more vectors of the one or more initial voiceprints corresponding to the one or more speech samples received from the live speaker, wherein the external stimulus is encoded with at least information detailing an objective of the external stimulus, a stimulus applied, and an intensity of the stimulus applied.

5. The method of claim 1, wherein the one or more initial voiceprints are adjusted using the generative adversarial network to fine tune attention masks and incrementally feeding back error until a user specified halting criteria is reached.

6. The method of claim 1, wherein the language model is trained using manually classified uncloned voice samples, and wherein the language model classifies the one or more voice clones into the grouping if the voice clone equals or exceeds a confidence level, wherein the grouping may be comprised of two or more subgroupings based a numerical difference between the corresponding vectors generated by mel-frequency.

7. The method of claim 1, wherein generating the new archetypal voice by blending the one or more voice clones further comprises:
averaging the corresponding vectors of the one or more voice clones of the cluster;
storing the new archetypal voice in the speech corpus, wherein the new archetypal voice is utilized in retraining the language model;
receiving text from the user; and
generating audio based on the text received from the user and the new archetypal voice.

8. The method of claim 1, wherein the generating of the one or more voice clones further comprises:
providing the one or more final voiceprints as input for a feedforward neural network, wherein each of the one or more final voiceprints are comprised of one or more multidimensional vectors; and
generating the one or more voice clones, wherein are each of the one or more voice clones are a corresponding audio version of the one or more final voiceprints.

9. A computer system for speech synthesis, comprising:
one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
generating one or more final voiceprints by adjusting one or more initial voiceprints using a generative adversarial network;
generating one or more voice clones based on the one or more final voiceprints;
classifying the one or more voice clones into a grouping using a language model, wherein the grouping is comprised of at least two or more subgroupings based on a multi-class classification performed by the language model using corresponding vectors, and wherein the two or more subgroupings are added as classifications to a speech corpus;
identifying a cluster within the grouping, wherein the cluster is identified by determining a difference between corresponding vectors of the one or more voice clones below a similarity threshold;
generating a new archetypal voice by blending the one or more voice clones of the cluster where the difference between the corresponding vectors is below the similarity threshold, wherein the new archetypal voice is labeled utilizing identifying information embedded in the one or more final voiceprints corresponding to the one or more voice clones below the similarity threshold; and generating a personalized archetypal voice by blending the new archetypal voice and at least one other archetypal voice selected by a user from the speech corpus using a display, wherein the display includes a plurality of labeled archetypal voices available to the user for blending.

10. The computer system of claim 9, wherein the one or more initial voiceprints are generated from one or more speech samples using a learned weight of a stack of encoders and a stack of decoders generated by the language model, the language model being trained by way of transfer learning.

11. The computer system of claim 9, wherein the one or more initial voiceprints are adjusted using the generative adversarial network to fine tune attention masks and incrementally feeding back error until a user specified halting criteria is reached.

12. The computer system of claim 9, wherein the language model is trained using manually classified uncloned voice samples, and wherein the language model classifies the one or more voice clones into the grouping if the voice clone equals or exceeds a confidence level, wherein the grouping may be comprised of two or more subgroupings based a numerical difference between the corresponding vectors generated by mel-frequency.

13. The computer system of claim 9, wherein generating the new archetypal voice by blending the one or more voice clones further comprises:
  averaging the corresponding vectors of the one or more voice clones of the cluster;
  storing the new archetypal voice in the speech corpus, wherein the new archetypal voice is utilized in retraining the language model;
  receiving text from the user; and
  generating audio based on the text received from the user and the new archetypal voice.

14. The computer system of claim 9, wherein the generating of the one or more voice clones further comprises:
  providing the one or more final voiceprints as input for a feedforward neural network, wherein each of the one or more final voiceprints are comprised of one or more multidimensional vectors; and
  generating the one or more voice clones, wherein are each of the one or more voice clones are a corresponding audio version of the one or more final voiceprints.

15. A computer program product for speech synthesis, comprising:
  one or more non-transitory computer-readable storage media and program instructions stored on at least one of the one or more tangible storage media, the program instructions executable by a processor to cause the processor to perform a method comprising:
  generating one or more final voiceprints by adjusting one or more initial voiceprints using a generative adversarial network;
  generating one or more voice clones based on the one or more final voiceprints;
  classifying the one or more voice clones into a grouping using a language model, wherein the grouping is comprised of at least two or more subgroupings based on a multi-class classification performed by the language model using corresponding vectors, and wherein the two or more subgroupings are added as classifications to a speech corpus;
  identifying a cluster within the grouping, wherein the cluster is identified by determining a difference between corresponding vectors of the one or more voice clones below a similarity threshold;
  generating a new archetypal voice by blending the one or more voice clones of the cluster where the difference between the corresponding vectors is below the similarity threshold, wherein the new archetypal voice is labeled utilizing identifying information embedded in the one or more final voiceprints corresponding to the one or more voice clones below the similarity threshold; and
  generating a personalized archetypal voice by blending the new archetypal voice and at least one other archetypal voice selected by a user from the speech corpus using a display, wherein the display includes a plurality of labeled archetypal voices available to the user for blending.

16. The computer program product of claim 15, wherein the one or more initial voiceprints are generated from one or more speech samples using a learned weight of a stack of encoders and a stack of decoders generated by the language model, the language model being trained by way of transfer learning.

17. The computer program product of claim 15, wherein the one or more initial voiceprints are adjusted using the generative adversarial network to fine tune attention masks and incrementally feeding back error until a user specified halting criteria is reached.

18. The computer program product of claim 15, wherein the language model is trained using manually classified uncloned voice samples, and wherein the language model classifies the one or more voice clones into the grouping if the voice clone equals or exceeds a confidence level, wherein the grouping may be comprised of two or more subgroupings based a numerical difference between the corresponding vectors generated by mel-frequency.

19. The computer program product of claim 15, wherein generating the new archetypal voice by blending the one or more voice clones further comprises:
  averaging the corresponding vectors of the one or more voice clones of the cluster;
  storing the new archetypal voice in the speech corpus, wherein the new archetypal voice is utilized in retraining the language model;
  receiving text from the user; and
  generating audio based on the text received from the user and the new archetypal voice.

20. The computer program product of claim 15, wherein the generating of the one or more voice clones further comprises:
  providing the one or more final voiceprints as input for a feedforward neural network, wherein each of the one or more final voiceprints are comprised of one or more multidimensional vectors; and
  generating the one or more voice clones, wherein are each of the one or more voice clones are a corresponding audio version of the one or more final voiceprints.

* * * * *